INVENTORS
ALFRED LEIFER
FRIEDRICH SCHILGEN
BY
ATTORNEY

UNITED STATES PATENT OFFICE 2,285,934

MECHANICAL INVERTER

Alfred Leifer and Friedrich Schilgen, Berlin, Germany, assignors to Telefunken Gesellschaft für Drahtlose Telegraphie m. b. H., Berlin, Germany, a corporation of Germany Application June 20, 1940, Serial No. 341,499
In Germany December 22, 1938

4 Claims. (Cl. 175—365)

The present invention is concerned with a mechanical inverter or chopper comprising a battery to supply direct current potential and a transformer designed to step up or down the ensuing alternating current. It is known in the art to furnish such an inverter with a condenser connected in parallel relation to the contact or contacts for the purpose of spark extinction or quenching, or, what amounts to the same thing, to connect the same in parallel relation to the primary winding or the secondary winding of the transformer.

Figure 1:
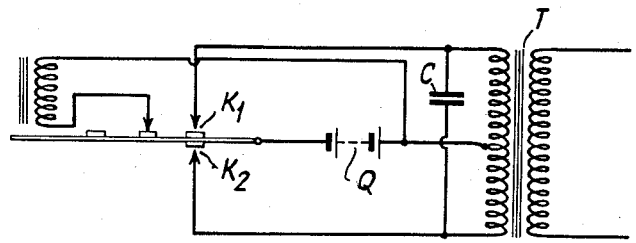
Figure 2:
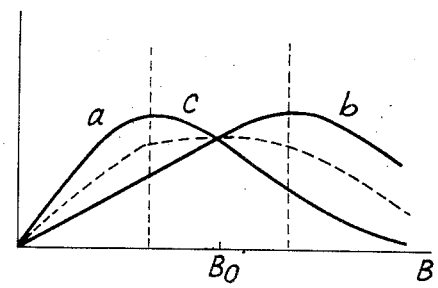
Figure 3:
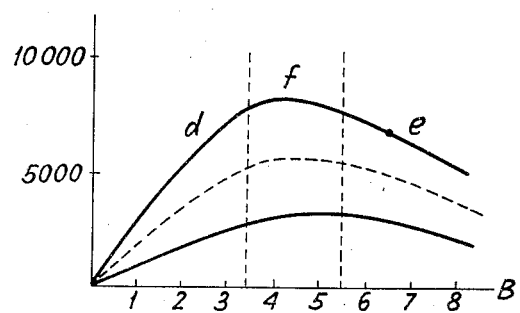

A circuit organization of this kind is shown in the drawing wherein Figure 1 illustrates the invention incorporated in the circuit of a vibratory inverter; and Figures 2 and 3 are curve sheets used in describing the operation of the invention. In Figure 1, the condenser C connected in parallel to the primary winding of transformer T is of such dimension that the time elapsing between the opening of the contact $K_1$ and the closing of the contact $K_2$ is just equal to a half period or an alternation of the decaying oscillation governed by the condenser C and the primary winding of transformer T. In this case condenser C, inside the said period of time, had been reversed in charge just to almost the opposite potential which it had at the instant when contact $K_1$ was opened so that the closing of contact $K_2$ can be accomplished practically under conditions free of sparking.

Now, the present invention is predicated upon the idea that the natural frequency of the decaying oscillation changes and that thus the effectiveness of spark quenching is impaired if, due to a change in the potential of the direct current potential source Q, the no-load (wattless) current and thus the permeability of the iron core of the transformer T, that is, its inductance, is altered. The effectiveness of the quenching of sparks is to be made independent of and unaffected by voltage variations by so forming the iron core that inside the range of fluctuation of the potential of the source Q the permeability of the core stays practically stable and constant.

This condition is insured by composing the core of the transformer of stocks or grades of iron having dissimilar permeability curves such that the ensuing permeability is high and as constant as possible inside the range of fluctuation of the operating potential.

The advantage of the invention results from the consideration that, while grades of iron are known in the art which exhibit a fairly constant permeability inside certain ranges, the permeability of these particular kinds of iron is mostly rather low. But the use of a core possessing very low permeability is unfavorable for use in a mechanical inverter for the reason that the wattless current is high with a resultant impairment of the efficiency of the device. However, by using different sorts of iron, it is possible to secure a permeability which at the same time is high as well as practically constant inside the range of fluctuation of the battery potential.

According to a preferred embodiment of the invention, two sorts of iron of such permeability are chosen that, in the presence of a change of the mean battery potential, the permeability of one of the said two kinds of iron increases, while that of the other is lowered. This is graphically illustrated by the curves Fig. 2. Referring to Fig. 2, $a$ is the curve showing the permeability $\mu$ as a function of the induction B of the core of one of the two kinds of iron, while curve $b$ shows the identical dependence for the other sort of iron. The dash-line curve $c$ shows the permeability curve of the core is assembled of laminations of both kinds of iron being superposed in alternation.

What has here been assumed is that the induction value $B_0$ in the presence of the normal battery potential comes to lie exactly between the two induction values where the crest values of curves $a$ and $b$ arise. Inside a range of fluctuation of $\pm 30$ percent of the direct current voltage indicated by vertical dash-lines, and thus of the induction, the permeability of the assembled or composite core changes only a few percent. As a result the spark quench action will be just as effective whether the direct current voltage battery (accumulator) has just been charged (or is buffered) or whether it has been discharged and exhausted to a large degree. This is important particularly for portable outfits for in that case accumulators of lower rated capacity can be used than has heretofore been the case.

A fairly constant and yet high permeability value is further obtainable by choosing one grade of iron from the viewpoint of obtaining the highest possible permeability, and the other grade of iron so as to secure constancy in the permeability value. If, for instance, one sort of iron used in the core has a permeability curve of a shape as shown by curve $d$, Fig. 3 (dynamo sheets with a high Si content), whereas the other sort of iron has a permeability curve as shown by graph $e$ (laminations with average Si content), condition can be made so that the ensuing curve $f$ of the composite core, just like curve $e$ shows a relatively flat form in the neighborhood of the crest, while yet lying fairly close to the maximum permeability values of curve $d$. The exact position of curve $f$ is a function, of course, of the thickness and the lamination or stratification ratio of the various grades of sheet material and can thus be determined.

In choosing the laminations corresponding to and covered by Fig. 3, recourse has been had at the same time to the principle explained by reference to Fig. 2 in that the crests of the two curves in respect to the normal operating point which here is to lie around 4.5 kilogauss have been shifted in contrary senses. The practically occurring range of fluctuation of the induction is a shown by the vertical dash-lines in Fig. 2.

Of course, it is also possible to use grades of iron possessing still higher permeability values, especially those with permeabilities exceeding the level of 15,000. At all events high permeability offers the advantage that the reactive or wattless current is reduced.

It is also recommendable to choose the iron from the viewpoint of minimization of the iron losses. More particularly speaking, these losses should lie below .5 watt per kilo. In the present invention where different grades of iron are used, this aim in most cases is satisfied in so far as the grade of iron possessing high permeability at the same time involves low iron losses so that the resultant iron losses of the core will also be relatively small.

We claim:

1. In a circuit arrangement for making direct current transformable, a source of direct current the voltage of which varies, a transformer having a primary section and a secondary section, a vibratory circuit interrupter including a vibrating reed, a driving circuit for said reed, said vibrating reed acting upon operation to periodically connect and disconnect the source of direct current across the transformer primary, said transformer being provided with an iron core composed of different grades of iron, said different grades of iron having such dissimilar characteristics that the resultant permeability of the core is high and that inside the range of variations of the voltage of the source of direct current voltage supply the same is substantially constant.

2. The arrangement described in claim 1, with the characteristic feature that the core is composed of two types of iron of such permeability that upon change of the mean potential of the source of direct current voltage supply the permeability of one sort of iron grows, while that of the other sort of iron diminishes.

3. The arrangement described in claim 1, with the characteristic feature that one grade of iron is chosen from the viewpoint of high permeability, and the other grade of iron from the viewpoint of a permeability being as constant and stable as feasible inside the range of fluctuation of the potential of the direct current source of supply.

4. In a device for rendering direct current transformable, a vibrating circuit interrupter, driving means thereof, a source of direct current whose voltage is subject to change from time to time from a mean value, a transformer having a primary winding and a secondary winding, said driving circuit acting upon operation to periodically connect and disconnect the source of direct current across at least a portion of said transformer primary winding, and a ferro-magnetic core for said transformer, a portion of said core being composed of material having a permeability which varies substantially in accordance with variations in the voltage of said source from said mean value, another portion of said core being composed of material having a permeability which varies inversely with variations in the voltage of said source from said mean value.

ALFRED LEIFER.
FRIEDRICH SCHILGEN.